ns

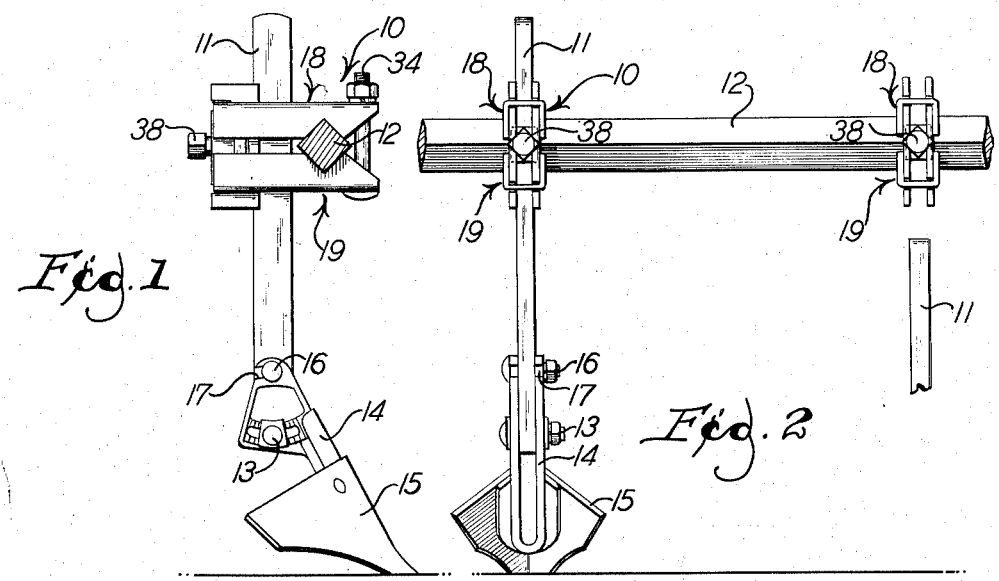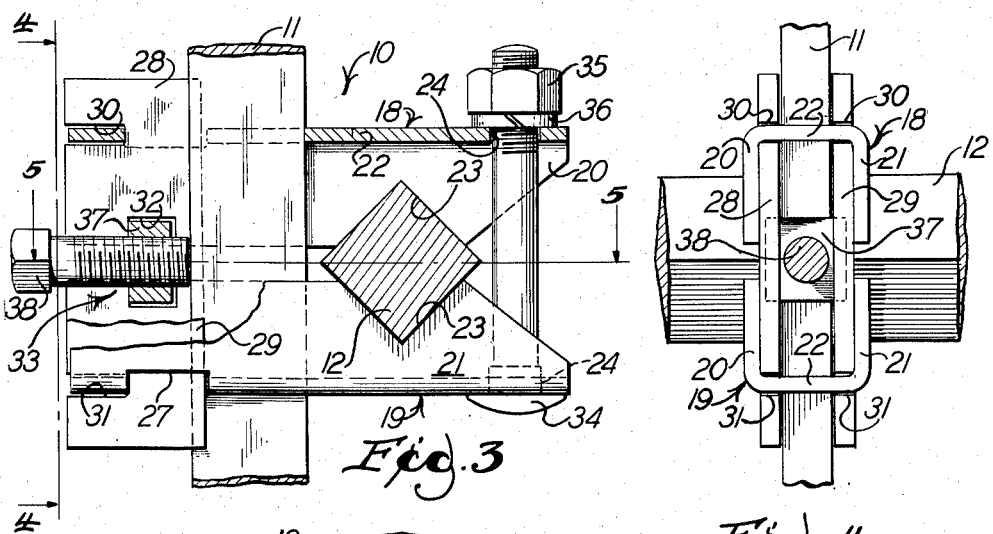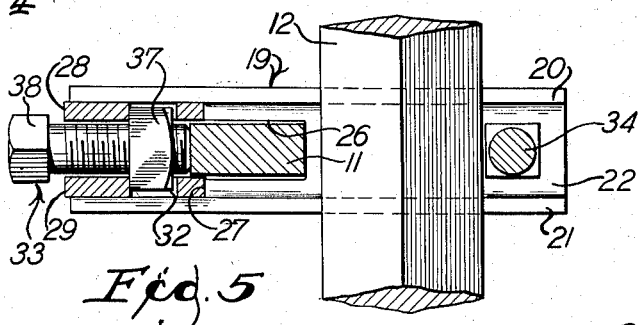

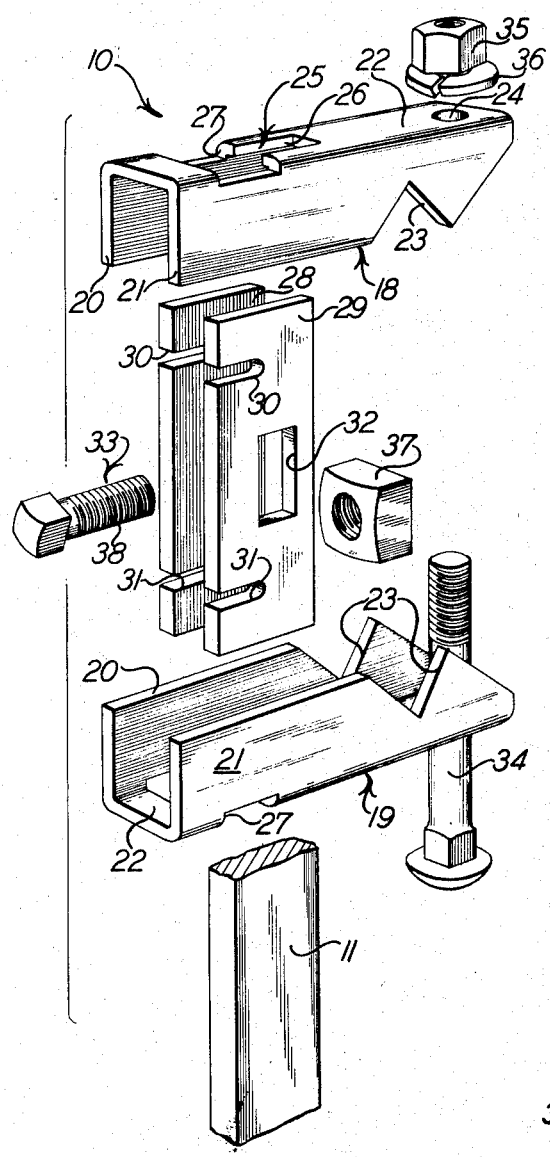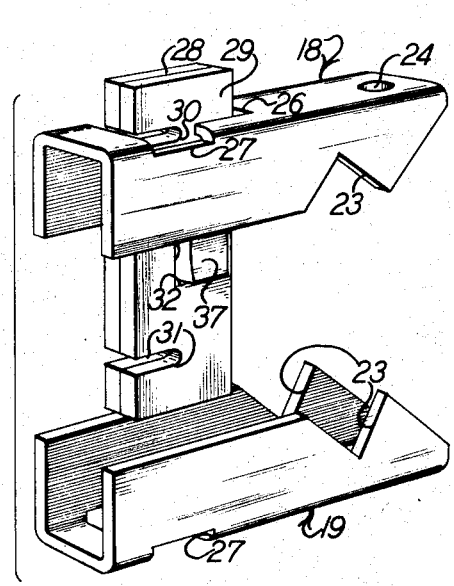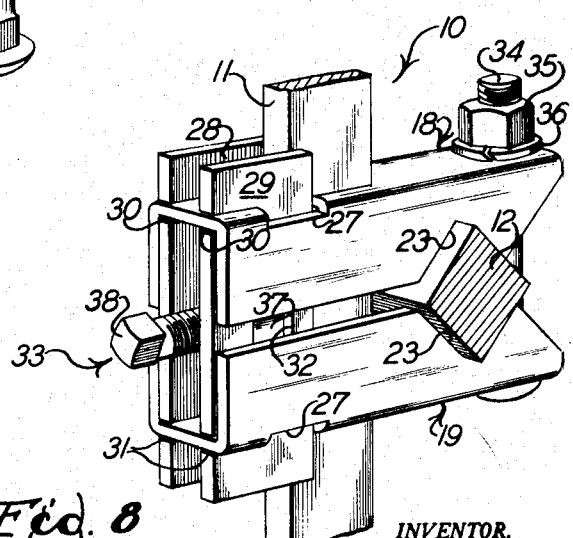

United States Patent Office 2,873,149
Patented Feb. 10, 1959

2,873,149

CULTIVATOR TOOL HOLDER

Emery C. Redetzke, Greenville, Mich., assignor to J. I. Case Company, Racine, Wis., a corporation of Wisconsin Application October 21, 1954, Serial No. 463,648

12 Claims. (Cl. 306—1.5)

The present invention relates to a tool clamp and, more particularly, to a cultivator tool for use in agricultural implements for adjustably connecting the standard of a cultivating tool to a tool bar.

It is a specific object of the present invention to provide a tool clamp for connecting the standard of a cultivating tool to a tool bar, the clamp being so constructed as to permit up-and-down adjustment of the standard of the cultivating tool with respect to the clamp without disturbing the adjustment of the clamp on the tool bar, and also to permit side-to-side adjustment of the clamp along the axial length of the tool bar without disturbing the up-and-down position of the cultivating tool with respect to the clamp.

A further object is to provide a tool clamp which can be easily and cheaply manufactured and which performs its function in a highly efficient manner.

Another object is to provide a cultivator tool clamp which permits easy and accurate adjustment of the cultivator standard on the tool bar.

Other objects and advantages will become apparent upon reading the following description in conjunction with the accompanying drawings, wherein, Fig. 1 is a side elevational view of a tool clamp illustrative of the present invention and shown in combination with a cultivating tool standard and a tool bar, with parts removed.

Fig. 2 is a rear elevational view of the structure shown in Fig. 1, with parts removed.

Fig. 3 is an enlarged side elevational view of certain structure shown in Fig. 1, with parts broken away to show details of construction.

Fig. 4 is a sectional view taken on the line 4—4 of Fig. 3, with parts removed.

Fig. 5 is a horizontal sectional view taken on the line 5—5 of Fig. 3.

Fig. 6 is an enlarged exploded perspective view of the clamp shown in Fig. 3.

Fig. 7 is a perspective view similar to Fig. 6 showing a step in the assembly of the tool clamp, with certain parts removed.

Fig. 8 is a perspective view similar to Fig. 6 showing the clamp assembled and on the tool bar.

Similar reference numerals refer to similar parts throughout the several views.

Referring to Figs. 1 and 2 of the drawings, a tool clamp, illustrative of the present invention and designated generally by the number 10, is shown in combination with a tool standard or shank 11 and a tool bar 12. The tool clamp 10 connects the standard 11 with the tool bar 12 in various selected positions as will be more fully described hereinafter. The tool bar 12, only a portion of which is shown, can be of any suitable or well-known type and is substantially square in cross-section in the present instance. Tool bars of this type are generally employed in mounted relationship on tractors, with the tool bar carried transversely with respect to the direction of travel of the tractor and one or more tools being clamped to the tool bar for cultivating, plowing, seeding, etc. Tool bars of this type are also used in combination with suitable wheel supported carriages wherein they are again carried transversely with respect to the direction of travel of the carriages. The standard 11, in the present instance, is substantially rectangular in cross-section and supports, adjacent its lower end by a bolt 13 or the like, a suitable foot piece 14 which in turn supports thereon a suitable cultivating shovel 15 of any well-known construction. The cultivator is preferably of the type which swings rearwardly in response to a predetermined draft force and it is, therefore, constructed with slots 17 on opposite sides of the standard 11 in the manner well-known in the art.

The preferred form of the tool clamp 10 consists of a pair of clamp members 18 and 19 which, in the present instance, are identical in construction. Clamp members 18 and 19 are preferably each formed of rigid sheet metal and are substantially channel shaped in cross-section with each member containing side portions 20 and 21 and an interconnecting web portion 22. One end of each of the clamp members is formed with a V-shaped notch 23 in each of the side portions 20 and 21, and a bolt receiving opening 24 is formed in the web portion 20 of each of the clamp members adjacent the notches 23. The notches 23 are in horizontal alignment for receiving the tool bar 12 when the clamp members 18 and 19 are positioned so that the openings 24 are substantially vertically aligned. In the other ends of the web portions 22 of each of the members 18 and 19 is formed a T-shaped opening 25 which includes an opening or slot 26 and a transverse opening or slot 27 which is interconnected with opening 26 and which extends across the web portion 22 to the side portions 20 and 21.

Clamp member 18 is connected to clamp member 19, adjacent one end of each, by means of a pair of connecting links 28 and 29. The links are preferably identical in construction and each has two inwardly extending slots 30 and 31 formed therein. The slots 30 and the slot 31 are aligned when the links are positioned in side-to-side relationship. A nut receiving opening 32 is spaced between the slots 30 and 31 in each of the links 28 and 29. The openings 32 receive a force transmitter, generally designated 33, which will be more fully explained hereinafter.

The opening 26 formed in each of the clamp members 18 and 19 is formed of a width sufficient to slidably receive therein the tool standard 11 without permitting any undue side-to-side play of the same when received therein. Both of the links 28 and 29 are formed of a thickness so that when they are positioned in side-to-side relationship they can be readily slidably received in the openings 26. The clamp member 18 is connected to the clamp member 19 by inserting the links 28 and 29, which are held together as shown in Fig. 7, into the openings 26 formed in the clamp members 18 and 19. The members 18 and 19 are positioned so that the notches 23 of the members are facing each other. The links 28 and 29 are then moved in the direction of openings 27 with the members 18 and 19 being spaced to position the web 22 of each of the members in receiving relationship with respect to the slots 30 and 31 of the links. The links are then moved until the web 22 of each of the clamp members is moved to the limit of the slots 30 and 31 as shown in Fig. 8. With the links 28 and 29 in this position, they are then capable of being moved laterally in the openings 27 in opposite directions toward the sides 20 and 21 of the clamp members. The tool clamp member is thus held at one end in a predetermined spaced position.

The clamping member tool bar receiving notches 23 are in alignment, as previously suggested, and the tool bar 12 is received between the clamping members and in the space formed by the tool bar receiving surfaces 23. A carriage bolt 34 is received in the opening 24 formed in the clamp 19 and it extends upwardly through the opening 24 formed in the clamp 18. A suitable nut 35 is threadedly received on that portion of the carriage bolt 34 which extends upwardly through the clamping member 18 and is effective for drawing the members together sufficiently to clamp the tool bar 12 rigidly therebetween with a lock washer 36 provided between the nut 35 and the web 22 of member 18 for well-known purposes.

It will be appreciated that the clamp thus described is capable of being secured to the tool bar 12 in a plurality of different positions along the axial length of the tool bar. Loosening the bolt 34 allows the clamp 10 to be positioned axially along the bar 12 at any selected position. Of course, tightening the bolt will secure the clamp on the bar.

As previously suggested, a force transmitting means 33 is supported between the connecting links 28 and 29. More specifically, a nut 37 is received in the opening 32 formed in each of the links 28 and 29 and the links are spaced sufficiently to trap therebetween the nut 37 while still allowing a suitable set screw 38 to be threadedly received in the nut 37. The latter is preferably square in shape so that it cannot rotate in the openings 32. The links 28 and 29 are also spaced sufficiently to permit the tool standard 11 to be slidably received in the opening 26 of each of the members 18 and 19. The standard can then be clamped so that the shovel 15 is secured in any desired vertical position with respect to tool bar 12 by turning the screw 38 in a direction which moves the same into abutting relationship with respect to the standard. The latter is wedged or held against the clamping members 18 and 19 by the force exerted by the screw 38 which moves the standard toward the bolt 34 to where the standard abuts the base of the openings 26.

It will be appreciated that the carriage bolt 34 and the nut 35 are effective for clamping the clamping members 18 and 19 in any desired position along the axial length of the tool bar 12, and that the force transmitting means 33 is effective for wedging the standard 11 against the members 18 and 19 in any desired axial position. The vertical adjustment of the tool standard 11 in the openings 26 is wholly independent of the adjustment of the members 18 and 19 along the axial length of the tool bar 12. A clamp of this type is of particular usefulness in association with a machine used for cultivating vegetables. In the growing of certain types of vegetables, the plants are planted in very accurately spaced-apart rows. In the cultivation of crops planted in rows of this type, it is necessary that the operator position his cultivating tools precisely with respect to the tool bar so that, in the course of cultivating the crop, no plants or plant will be damaged because of an improperly spaced tool. After the tool is properly positioned with respect to the axial length of the tool bar, it is desirable that the connecting tool clamp be such that the operator is able to adjust the vertical position of the tool with respect to the tool bar without disturbing the position of the clamp with respect to the axial length of the tool bar.

While a specific embodiment of this invention has been shown and described, it should be obvious that certain changes can be made and the invention should, therefore, be limited only by the appended claims.

I claim:

1. A tool clamp for connecting a tool standard to a tool bar comprising a pair of clamping members positionable in opposed clamping relationship with respect to said tool bar, each of said clamping members having formed therein a tool standard receiving opening, means for holding said clamping members in predetermined spaced-apart relationship at one end thereof, a connector securing the other end of said clamping members, said means and said connector being positioned on opposite sides of said tool bar to urge said clamping members into a clamping position on said tool bar, and a force transmitter carried by said means between said clamping members and bearable against said tool standard when the latter is received in said standard receiving openings for tightly holding said tool standard against the ends of each of said openings.

2. A tool clamp for connecting a tool standard to a tool bar comprising a pair of clamping members positionable in opposed clamping relationship with respect to said tool bar, each of said clamping members having formed therein a tool standard receiving opening, means for holding said clamping members in predetermined spaced-apart relationship adjacent opposed ends thereof, a force transmitting means interconnecting the other ends of said clamping members, the first mentioned means and said force transmitting means straddling said tool bar, said force transmitting means urging said clamping members sufficiently in a clamping direction to clamp the clamping members to the tool bar, a nut carried by said first mentioned means between said clamping members and held against rotative and axial movement with respect thereto, and a screw threadedly received by said nut and bearable against said tool standard when said tool standard is received in said standard receiving openings for wedging said tool standard against the end of each of said openings.

3. A tool clamp for connecting a tool standard to a tool bar comprising a pair of clamping members positionable in clamping relationship with respect to said tool bar, each of said clamping members having corresponding openings formed therein, links interconnected between said clamping members for holding said clamping members in predetermined spaced-apart relationship, a force transmitting means connecting the other end of said clamping members, said force transmitting means and said links being positioned on opposite sides of said tool bar, said force transmitting means urging said clamping members sufficiently in a clamping direction against said tool bar to secure the same thereto in fixed relationship, and a second force transmitting means carried by said links and bearable against said tool standard when said tool standard is received in said openings for wedging said tool standard against the ends of said openings, said tool standard being capable of being adjusted in said openings independently of adjustment of said clamping members axially on said tool bar.

4. A tool clamp for adjustably attaching a tool standard to a tool bar, comprising a pair of clamping members including surfaces for engaging said tool bar, each of said clamping members having an opening formed therein adjacent one end thereof, links disposed between the ends of said clamping members for holding said clamping members in predetermined spaced-apart relationship at said ends, a force transmitting means connecting the other ends of said clamping members, the force transmitting means and said links being positionable on opposite sides of the assembled location of said tool bar, said force transmitting means being capable of urging said clamping members sufficiently in a clamping direction against said tool bar to secure the same thereto in fixed relationship, a nut carried by said links between said clamping members and held against rotative and axial movement with respect thereto, and a screw threadedly received by said nut between said links to be in bearing relationship against said tool standard when said tool standard is received in said openings for wedging said tool standard against the ends of said openings, said tool standard being capable of being adjusted in said openings independently of the adjustment of said clamping members axially on said tool bar.

5. A tool clamp for adjustably attaching a tool standard to a tool bar, comprising a pair of U-shaped clamping members having formed therein suitable tool bar receiving notches and each member having an opening, an interconnecting link between said members to be received in said opening, said opening being formed of a size to slidably receive said tool standard adjacent said interconnecting link, a nut carried by said link between said clamping members and held against rotative and axial movement, a screw threadedly received by said nut to be in bearing relationship against said standard upon being turned in one direction a predetermined amount whereby said standard is forced against the base of said opening, and a force transmitting means for connecting the opposite ends of said clamping members and for urging said clamping members sufficiently in a clamping direction to secure the same to said tool bar in selective positions along the axial length of said tool bar.

6. The improvement recited in claim 5 further characterized by said interconnecting link having spaced slots formed therein whereby said clamping members are received in said slots to be held in predetermined spaced-apart relationship.

7. A tool clamp for interconnecting a tool standard and a tool bar comprising a pair of clamping members, each of said members being substantially channel-shaped in cross-section and having formed therein suitable tool bar receiving notches for receiving therein said tool bar, said clamping members being positioned in clamping relationship with respect to said tool bar, each of said clamping members having an opening formed adjacent one end thereof, a pair of spaced-apart interconnecting links received in each said opening and being provided with means for holding said ends of said clamping members in predetermined spaced-apart relationship, said openings being formed of a size to slidably receive said tool standard therein between said interconnecting links, a nut carried between said links and between said clamping members and held against rotative and axial movement with respect thereto, a screw threadedly received by said nut between said links and in bearing relationship against said standard upon being turned a predetermined amount in one direction whereby said standard is forced against the ends of said opening in selective positions therein, and a force transmitting means for interconnecting the opposite ends of said clamping members and for urging said clamping members sufficiently in a clamping direction to secure the same to said tool bar in selective positions along the axial length of said tool bar.

8. A tool clamp for connecting a tool standard to a tool bar comprising a pair of clamping members positionable in clamping relationship with respect to said tool bar, each of said clamping members having formed therein a T-shaped opening including a fore-and-aft extending slot and a transverse slot connected with said fore-and-aft extending slot, said T-shaped openings being in substantially vertical alignment when said clamping members are positioned in clamping relationship with respect to said tool bar and substantially parallel with respect to the horizontal, a link slidably received in the fore-and-aft slots of said T-shaped openings, said link having formed therein a pair of spaced and substantially parallel clamping member receiving slots wherein said link can be moved into each said transverse slot and shifted laterally to opposite sides of each said transverse slot, said link holding said clamping members in predetermined spaced-apart relationship at opposed ends thereof, a force transmitting means connected between the other ends of said clamping members for urging said members in a clamping direction with a force sufficient to secure said tool clamp to said tool bar, and a force transmitting means carried by said link between said clamping members and bearable against said tool standard when said tool standard is received in said fore-and-aft extending slots for holding said standard tightly against the ends of said fore-and-aft slots, said tool standard being capable of vertical adjustment with respect to said tool bar independent of the adjustment of said clamping members along the axial length of said tool bar.

9. A tool clamp for connecting a tool standard to a tool bar comprising a pair of clamping members positionable in clamping relation on said tool bar, each of said clamping members having formed therein a tool bar engaging surface and an opening, said openings being in substantially vertical alignment on one side of said tool bar when said clamping members are positioned in clamping relation on said tool bar, a pair of links removably vertically received at opposite ends in said openings, each of said links having formed therein a pair of spaced substantially parallel clamping member receiving slots whereby said links hold said clamping members in predetermined spaced-apart relationship, a force transmitting means connected between the other ends of said clamping members on the opposite side of said tool bar for urging said members in a clamping direction with a force sufficient to secure said tool clamp to said tool bar, and a force transmitting means carried by said links between said clamping members and operable on said tool standard when said tool standard is received in said clamping member openings whereby said standard is tightly held against the ends of said openings to permit said tool standard to be vertically adjusted with respect to said tool bar independently of the adjustment of said clamping members along the axial length of said tool bar.

10. In a cultivating tool holder of the type attachable to a tool bar, the combination comprising a pair of clamping members suitable for engaging a cultivator tool standard, said clamping members having tool bar engaging notches, a spacer attached to one end of said clamping members, a connector attached to the other end of said clamping members to be disposed to the side of said tool bar engaging notches opposite said spacer, said connector being adjustable for clamping said tool bar between said clamping members in said notches thereof, a screw threadedly associated with said spacer arranged for adjustably securing said standard between said spacer and said clamping members.

11. In a cultivating tool holder of the type employed in attaching a vertical tool standard to a horizontal tool bar, the combination comprising a pair of clamping members having means for vertically receiving said tool standard and other means for horizontally receiving said tool bar in a manner to restrict movement between said clamping members and said tool bar transverse to the axis of the latter and to secure said clamping members and said tool bar in a certain angular relation, a connector attached to one end of said clamping members to be on one side of said tool bar, a first screw attached to the other end of said clamping members to be vertically disposed on the other side of said tool bar for adjustably securing said clamping members in a selected position along the axis of said tool bar, and a second screw attached to said connector to be horizontally disposed to abut said standard when the latter is received in said clamping members to thereby adjustably secure said standard between said connector and said clamping members.

12. In a cultivating tool holder for attaching a vertical tool standard to a horizontal tool bar, the combination comprising a pair of clamping members having openings for vertically receiving said tool standard and means for horizontally receiving said tool bar, a pair of connector plates receivable in said openings for restrictively spacing apart one end of said clamping members, a first screw attachable between the opposite ends of said clamping members to be disposed parallel to said plates whereby said plates and said screw are on opposite sides of said tool bar, and a second screw engaged with said plates to be transverse to said first screw to abut said standard and permit adjustable forcing of the same against said clamping members when said standard is received in said openings of said clamping members.

References Cited in the file of this patent

UNITED STATES PATENTS

| | | |
|---|---|---|
| 660,969 | Renfrow | Oct. 30, 1900 |
| 916,212 | Stalans | Mar. 23, 1909 |
| 1,410,084 | Viar | Mar. 21, 1922 |
| 2,655,088 | Charley | Oct. 13, 1953 |
| 2,693,748 | Kiser | Nov. 9, 1954 |